(12) United States Patent
Muskat

(10) Patent No.: US 9,028,188 B2
(45) Date of Patent: May 12, 2015

(54) RETENTION PIN AND METHOD OF FORMING

(71) Applicant: Rolls-Royce North American Technologies, Inc., Indianapolis, IN (US)

(72) Inventor: James C. Muskat, Mooresville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 14/101,814

(22) Filed: Dec. 10, 2013

(65) Prior Publication Data
US 2014/0271038 A1     Sep. 18, 2014

Related U.S. Application Data

(60) Provisional application No. 61/780,746, filed on Mar. 13, 2013.

(51) Int. Cl.
| F16B 19/08 | (2006.01) |
| F16B 19/06 | (2006.01) |
| F01D 9/02 | (2006.01) |
| F01D 11/00 | (2006.01) |
| F02C 7/28 | (2006.01) |

(52) U.S. Cl.
CPC ............. F16B 19/06 (2013.01); F01D 9/023 (2013.01); F01D 11/005 (2013.01); F02C 7/28 (2013.01); *F05D 2230/23* (2013.01); *F05D 2240/57* (2013.01)

(58) Field of Classification Search
USPC .......... 411/500, 501, 504, 505, 506
See application file for complete search history.

(56) References Cited

U.S. PATENT DOCUMENTS

| 86,726 A | * | 2/1869 | Bourne | 411/501 |
| 384,318 A | * | 6/1888 | Kirks | 411/501 |
| 2,268,416 A | | 12/1941 | Nelson | |
| 2,293,894 A | * | 8/1942 | Fether | 219/150 V |
| 2,413,370 A | | 12/1946 | Palmer | |
| 2,638,525 A | | 5/1953 | Candy | |
| 2,685,813 A | * | 8/1954 | Lampman et al. | 87/1 |
| 3,279,517 A | | 10/1966 | Logan | |
| 3,405,594 A | * | 10/1968 | Falcioni | 411/501 |

(Continued)

FOREIGN PATENT DOCUMENTS

| EP | 1728569 A1 | 12/2006 |
| GB | 1353219 A | 5/1974 |

OTHER PUBLICATIONS

International Search Report PCT/US2013/072928 mailed on Oct. 6, 2014.

(Continued)

*Primary Examiner* — Roberta Delisle
(74) *Attorney, Agent, or Firm* — Fishman Stewart Yamaguchi PLLC

(57) ABSTRACT

An improved retention pin assembly and method of forming a pin assembly that uses a melt in a pocket without a metallurgical joint having been formed. The assembly can be generated by a method of forming a joint which includes providing a metal shaft and a member that is operable to receive the shaft. A pocket is formed within the member which operates to receive a melt pool. Next the shaft is inserted into apertures in the member. A welding or melting operation is then performed to create a melted portion that occupies the pocket. A joint is created using a retention pin.

20 Claims, 2 Drawing Sheets

(56) References Cited

U.S. PATENT DOCUMENTS

| | | | |
|---|---|---|---|
| 3,481,634 A | 12/1969 | Rondeau | |
| 3,642,312 A * | 2/1972 | Dalton | 403/408.1 |
| 3,854,030 A | 12/1974 | Roye | |
| 3,905,173 A | 9/1975 | Gerken | |
| 4,221,041 A * | 9/1980 | Hufnagl et al. | 29/512 |
| 4,439,661 A | 3/1984 | Doyle et al. | |
| 4,614,855 A | 9/1986 | Hinden | |
| 4,855,561 A | 8/1989 | Hinden | |
| 5,393,164 A | 2/1995 | Renner et al. | |
| 5,579,986 A | 12/1996 | Sherry et al. | |
| 5,797,723 A | 8/1998 | Frost et al. | |
| 6,176,662 B1 | 1/2001 | Champney et al. | |
| 6,205,625 B1 | 3/2001 | Kato | |
| 6,241,442 B1 | 6/2001 | Schaty et al. | |
| 6,497,543 B1 | 12/2002 | Lyons | |
| 6,875,947 B2 | 4/2005 | Sichtermann et al. | |
| 7,227,096 B2 | 6/2007 | Barton | |
| 7,364,394 B2 | 4/2008 | Ramasamy | |
| 7,419,352 B2 * | 9/2008 | Guentert et al. | 415/189 |
| 7,452,171 B2 | 11/2008 | Albrecht et al. | |
| 7,549,845 B2 | 6/2009 | Uwami et al. | |
| 7,654,782 B2 | 2/2010 | Nilsen et al. | |
| 2004/0164124 A1 | 8/2004 | Lundstrom et al. | |
| 2004/0239050 A1 * | 12/2004 | Antunes et al. | 277/630 |
| 2006/0177284 A1 * | 8/2006 | Keener et al. | 411/501 |
| 2011/0027047 A1 * | 2/2011 | Vas | 411/504 |
| 2011/0142566 A1 | 6/2011 | Drexler et al. | |

OTHER PUBLICATIONS

International Search Report PCT/US2014/023852 mailed on Oct. 6, 2014.

* cited by examiner

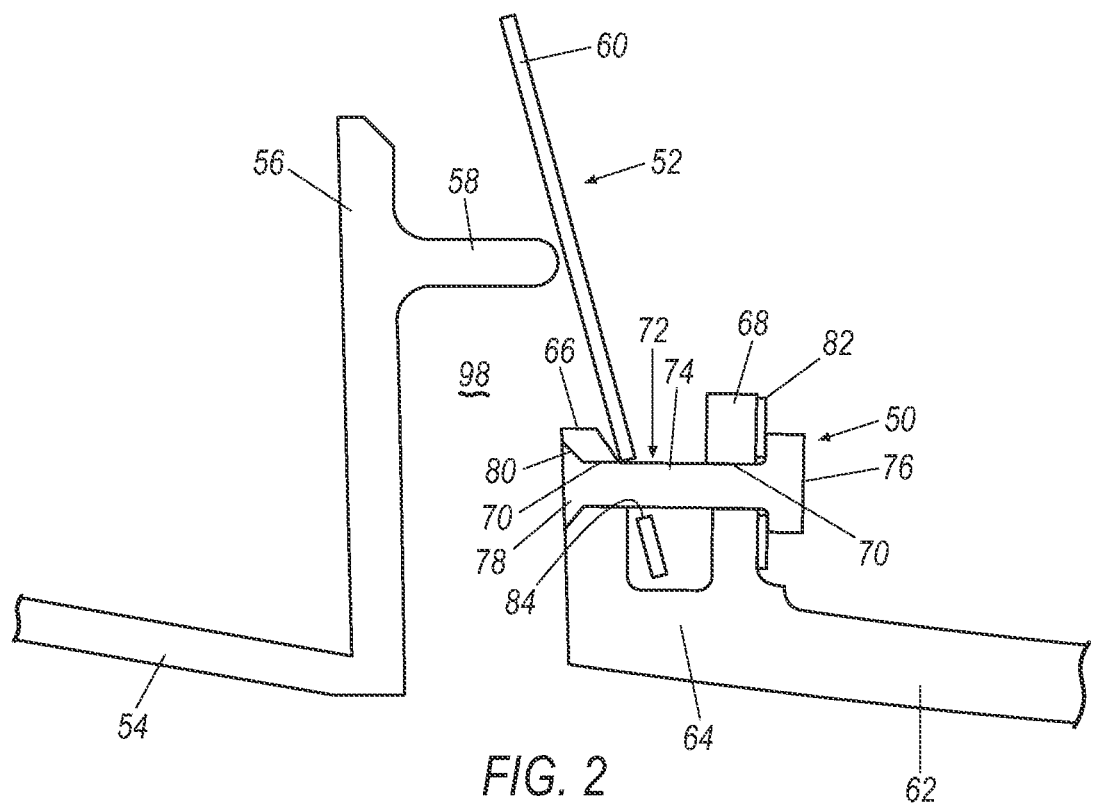
FIG. 2
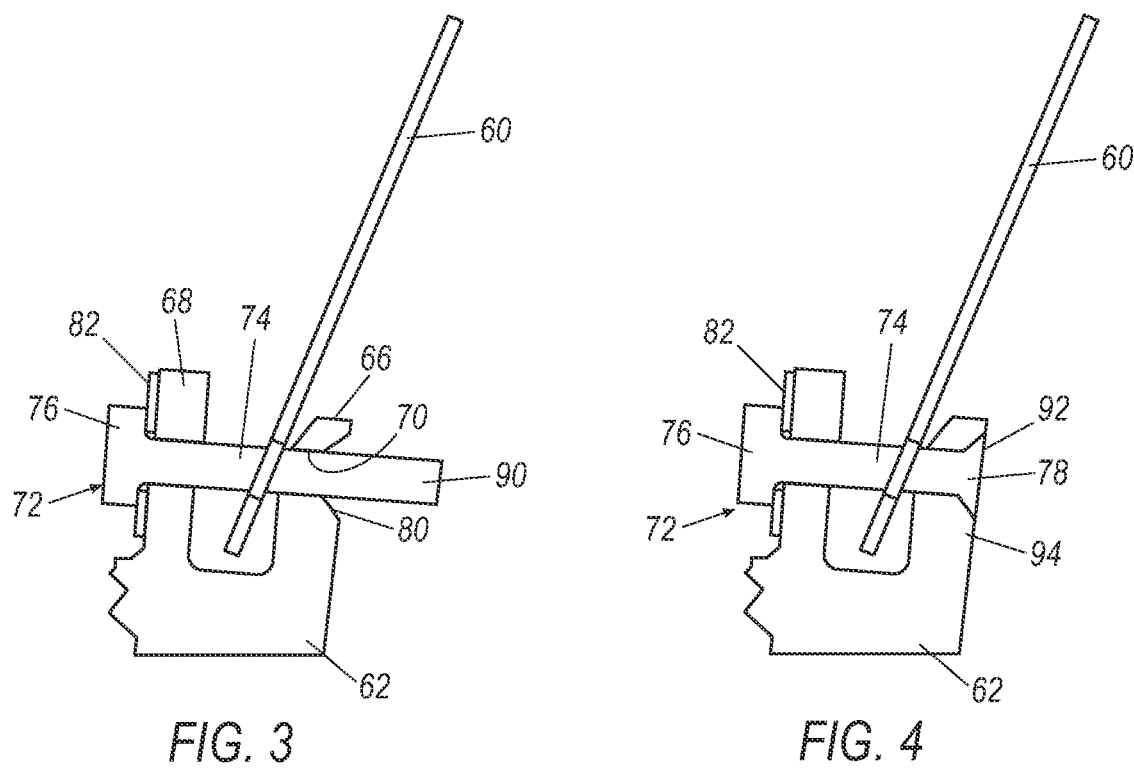
FIG. 3
FIG. 4

RETENTION PIN AND METHOD OF FORMING

CROSS-REFERENCE TO RELATED APPLICATIONS

This application is claims priority to U.S. Provisional Patent Application No. 61/780,746 filed Mar. 13, 2013, the contents of which are hereby incorporated in their entirety.

GOVERNMENT RIGHTS

This application was made with government support under N00019-96-C-0176 awarded by the United States Navy. The government has certain rights in the application.

FIELD OF TECHNOLOGY

An improved retention pin, and more particularly, a pin and method of forming a pin assembly that uses a melt in a pocket without a metallurgical joint having been formed.

BACKGROUND

Traditionally mechanical fasteners are used to mechanically link two or more articles together. Mechanical fasteners come in various shapes and sizes and they have a variety of constructs. The type of construct depends in part on the environmental conditions in which the fastener system must operate. Some may operate in high stress, shear, compression or tension conditions, and some may operate in high temperature, low temperature, or just ambient temperature conditions. Thus, depending on the circumstances, the design of fastener system may be changed.

One style of mechanical fastener includes rivets. A problem with rivet type fasteners is that rivet heads have been known to be liberated into engines, causing damage. This is because the rivet construct may not have tightly controlled material strength and structural integrity. This in part may be because the quality of the rivet is subject to the quality of work of the operator who forms the rivet. If a rivet has been unknowingly overworked, it may not have the fatigue life that was assumed. Thus, rivet constructs are not dependable or desirable to use in engines, or other locations or machinery, where potentially causing damage to the machinery is an issue.

It would be helpful to provide an improved mechanical joint. Such a joint could be formed by a welder who melts a retention pin only into a pocket. The welder can watch the molten metal flow into the pocket to know that he has finished the forming operation. The fatigue properties of the melt-formed pin may be the same as the solution heat treated form of the pin material.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

FIG. 2 illustrates a side sectional view of a seal assembly having a pinned connection;

FIG. 3 illustrates a side sectional view of a joint assembly, where the joint has not yet been welded; and FIG. 4 illustrates a side sectional view of the joint assembly, where a melt has been formed without creating a metallurgical joint.

DETAILED DESCRIPTION

Figure 1:
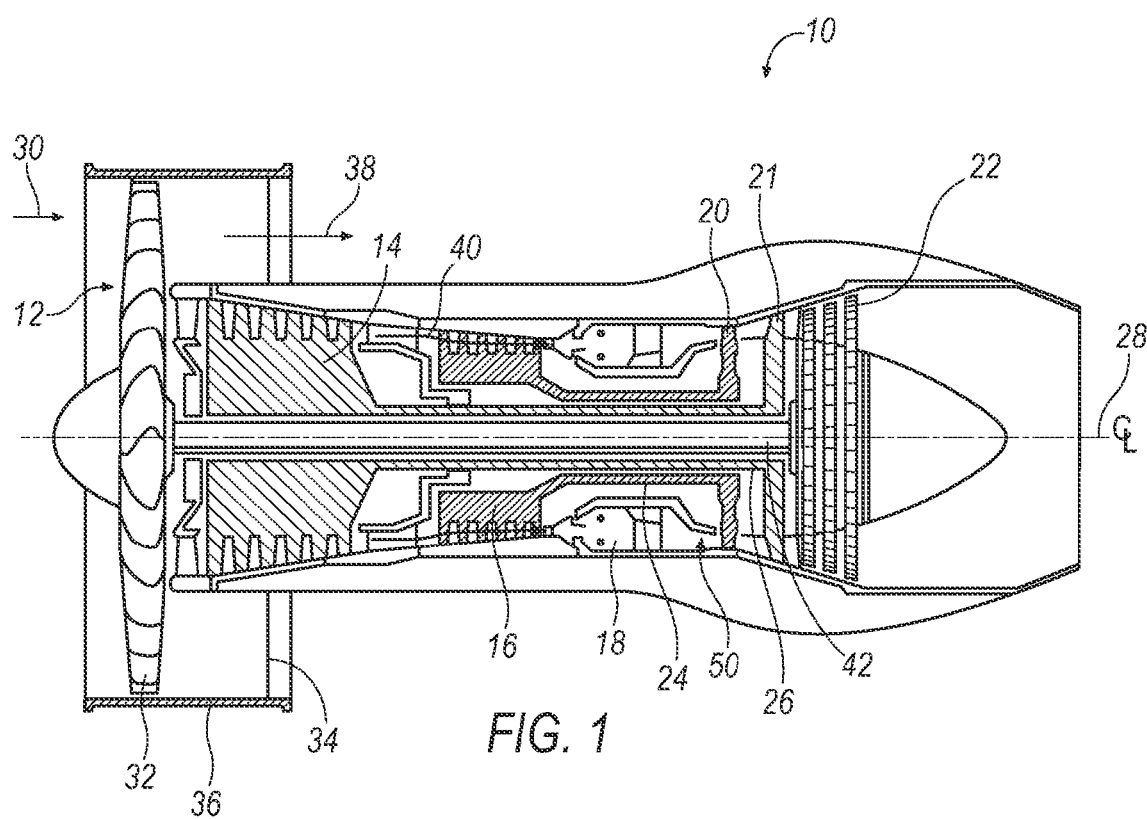
FIG. 1 illustrates a schematic view of a gas turbine engine.

An exemplary embodiment includes a retention pin and method of forming a seal assembly which may be used where seals are employed. Such a pin could be used on any conceivable assembly, not just to retain leaf seals on turbine engine nozzle guide vanes, the example shown herein. Thus, it will be appreciated that the seal assembly, and methodology, could be used in other applications, for example, in machinery where it is helpful to provide an improved joint using a retention pin, particularly where it is desirable to not use a rivet assembly.

Traditionally a rivet could be used to secure multiple members together. However, rivets are generally forbidden from being used near the main flow path of gas turbine engines. Thus, an exemplary embodiment overcomes this problem by providing a method and construct that has the requisite retentive functionality of a rivet without a rivet construct being used. This is accomplished by providing a headed pin that has a distally opposed smaller diameter end that is melted by a welder. The molten pin metal flows into a countersink or bore-like pocket in the underlying component. The molten pin metal immediately cools to fill the pocket. Excess solidified metal can then be ground flush with the surface into which the pocket was formed if desired for clearance with the environment.

Another exemplary embodiment provides a retention pin assembly having molten metal that has quickly cooled when it contacted the underlying part's surface, thereby precluding any melting of the underlying surface. This produces a mechanical joint rather than a metallurgical joint. The pin is free to rotate because there is no metallurgical joint. This also makes it very simple to remove the pin, such as would be done during an engine overhaul, without altering the underlying component; a simple drill is used to remove the pin material in the pocket and the pin can be pulled out of the components that it was retaining together. Thus, a serviceable retention pin assembly is contemplated.

FIG. 1 illustrates a gas turbine engine 10, which includes a fan 12, an intermediate pressure compressor and a high pressure compressor, 14 and 16, a combustor 18, a high pressure turbine, an intermediate pressure turbine, and a low pressure turbine, 20 and 21 and 22, respectively. The high pressure compressor 16 is connected to a first rotor shaft 24 while the intermediate pressure compressor 14 is connected to a second rotor shaft 26 and the fan is connected to a third rotor shaft 42. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved retention pin assembly 50 for retaining a leaf seal that is operable to direct hot combustion gases onto rotor blades of the turbine 20.

With reference to FIG. 2, a retention pin assembly 50 can be used with a leaf seal assembly 52 for use in hot combustion gas pathways of a gas turbine engine 10. It will be appreciated that the pin assembly 50 may be used in other applications where it is desirable to provide an improved seal. The seal assembly 52 includes a first member 54 having an upwardly extending wall 56. A depending member 58 extends from the wall 56 and forms a rest for a leaf seal 60 to engage.

The seal assembly further includes a base 62 with a u-shaped portion 64 having a first upwardly extending support 66 and a second upwardly extending support 68. The supports are shown integral with the base 62. The base 62 and the member 54 are made of metal that is operable in gas turbine engine type environments. The supports 66 and 68 have apertures 70 for receiving a shaft of a retention pin. The apertures 70 are slightly larger than the diameter of the shaft so as to permit movement of the shaft relative to the supports 66 and 68.

The pin assembly 50 includes a retention pin 72 having a shaft 74, a head 76, and a melted end 78. The melted end 78 resides loosely within a conic shaped void 80 that is formed within the support 66. It will be appreciated that the void's shape can vary, and could include other shapes such as, but not limited to, round, stepped, or elliptical. Washers 82 can be provided adjacent the head 76. The leaf seal 60 is retained at an aperture 84 by the shaft 74 of the pin 72.

FIG. 3 illustrates a first step in the process of manufacturing a retention pin assembly 50 having a melt end 90 to form the locking feature of the pin 72 relative to the base 62. The first step includes providing a leaf seal 60 and inserting a pin 72 through an aperture 70 in support arm 66. The pin 72 is then passed through the aperture 84 of the leaf seal 60. An opposing end 90 of the pin 72 includes an elongated portion that passes through aperture 70. A sufficient amount of material at the melt end 90 of the pin 72 should be present so as to provide a sufficient amount of volume of melt 78 that consumes the conic void 80 in the support 66.

FIG. 4 illustrates the next step of forming the assembly where the retention pin 72 now becomes loosely, mechanically joined to the support arm 66 and 68. This is accomplished by heating, via welding or some other means, the melt end 90 of the pin 72. This melting step may continue until a melt 78 or pool of material fills the conic shaped void 80. The welding does not, however, cause any metallurgical displacement or connection between the support 66 and the pin 72. Once the pool of melted material 78 is cooled, the pin 72 is not rigidly affixed to the base 62. Instead the pin 72 may be able to rotate within the aperture 70. As shown in FIG. 4, the melt 78 has smooth exterior surface 92 that is nearly flush with the surface 94 of the base 62. This may be accomplished by use of a finishing step, such as grinding, so as to provide a smooth surface to enhance clearance within passageway 98 (see FIG. 2.). The pin 72 can be constructed of any material that can be melted using a welder. The melt-formed pin head material can have the same material properties as the remainder of the pin that was not melted if the pin was in the solution heat treated condition prior to weld melting of the smaller end.

The retaining pin 72 has a residual, axial load after forming. The residual load results from the thermal expansion of this pin 72 during melting, with negligible expansion of the underlying components being retained together due to their relatively large mass relative to the pin, followed by thermal contraction of the pin upon release from heat input from the welder. The net result is a small load. This axial load is customizable in that the length, cross sectional area, and material conductivity of the pin 72 are customizable features that can be exploited to limit heat input into the pin, thus allowing a tailoring of expansion of the pin with resulting tailoring of the residual axial load in the pin following cool down.

It will be appreciated that the retention pin 72 is customizable in size to accommodate any requirement. The melted material 78 completely fills the pocket or void 80, thereby maximizing the use of the material to provide retention.

The voids 80 into which the pin 72 is melted can be undercut, such that the melted portion 90 cannot be liberated even in the event that the pin were to be severed or worn-through during fielded operation. In an alternative embodiment, both ends of the pin 72 could be melted into opposing pockets if desired, and undercuts could be utilized on both ends to preclude liberation of either of the headed ends of the pin.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A retention pin assembly comprising:
   a stud, the stud having a head, a shaft and a deformable end;
   at least one support member, the support member having an opening for receiving the stud, the support member further including a pocket; and
   wherein the deformable end of the stud is thermally deformed and occupies the pocket of the support member to form a mechanical retainer within the pocket without forming a metallurgical joint between the stud and the pocket.

2. The pin assembly as claimed in claim 1, further comprising a smooth surface extending between the retainer and the support member.

3. The pin assembly as claimed in claim 1, further comprising a second support member which has an opening for receiving the stud.

4. The pin assembly as claimed in claim 1, further comprising a leaf seal that pivots about the stud.

5. The pin assembly as claimed in claim 1, wherein the head is deformable by a melting process to form a mechanical retainer relative to a second support member.

6. The pin assembly as claimed in claim 1, wherein the pocket is conic shaped, the deformable end seats within the conic shaped pocket.

7. The pin assembly as claimed in claim 1, further comprising a leaf seal secured to the stud, the leaf seal is operable to engage a member to seal off a gas pathway.

8. The pin assembly as claimed in claim 1, further comprising a gas turbine engine.

9. A pin joint comprising:
   a shaft having a first end and a second end;
   an enlarged head located on the first end of the shaft;
   a first diameter of the shaft that is located adjacent the enlarged head;
   a second diameter on the shaft that is located near the second end;
   the second end of the shaft being thermally deformed to define a third diameter, and
   wherein the third diameter is greater than at least one of the first diameter and the second diameter of the shaft.

10. The pin joint as claimed in claim 9, further comprising a first support member having an opening to receive the first diameter of the shaft.

11. The pin joint as claimed in claim 9, further comprising a second support member having an opening to receive the second diameter of the shaft.

12. The pin joint as claimed in claim 9, further comprising a support member that has a void in an outer surface, the void housed substantially the third diameter of the shaft.

13. The pin joint as claimed in claim 9, further comprising a support member having a pocket in a surface, the pocket is conic shaped.

14. The pin joint as claimed in claim 9, wherein the third diameter of the shaft is thermally deformed via a welding process.

15. A method of forming a joint comprising the steps:
providing a metal shaft having a first end and a deformable end opposite thereof;
providing a member having an aperture operable to receive the shaft;
forming a pocket in the member on a surface facing away from a direction of insertion;
inserting the shaft into the member along the direction of insertion; and
melting the deformable end of the shaft to create a melted portion, the melted portion occupying the pocket, wherein the melted portion of the shaft defines a diameter greater than a diameter of the aperture of the member.

16. The method of forming a joint as claimed in claim 15, wherein the step of melting the deformable end of the shaft does not include forming a metallurgical joint between the shaft and the member.

17. The method of forming a joint as claimed in claim 15, wherein the step of inserting the shaft into the member includes mounting a leaf seal on the shaft.

18. The method of forming a joint as claimed in claim 15, wherein the step of forming a pocket in the member includes machining the pocket to have a conic shaped configuration.

19. The method of forming a joint as claimed in claim 15, further comprising the step of generating a smooth surface between the melted portion and a surface of the member.

20. The method of forming a joint as claimed in claim 15, wherein the melting step includes welding the deformable end of the shaft to create a melt pool within the pocket, and then cooling the melt pool to define the melted portion.

\* \* \* \* \*